US012065936B2

(12) United States Patent
Lizzer et al.

(10) Patent No.: US 12,065,936 B2
(45) Date of Patent: Aug. 20, 2024

(54) PROBE PLACEMENT WITHIN A DUCT OF A GAS TURBINE ENGINE

(71) Applicant: GE Avio S.r.l., Rivalta di Torino (IT)

(72) Inventors: Cristian Lizzer, Turin (IT); Maciej Slawinski, Warsaw (PL); Wojciech Lukasz Staszynski, Warsaw (PL); Jan Biskupski, Warsaw (PL)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 17/409,943

(22) Filed: Aug. 24, 2021

(65) Prior Publication Data

US 2022/0090513 A1    Mar. 24, 2022

(30) Foreign Application Priority Data

Sep. 18, 2020  (IT) .......................... 102020000022096

(51) Int. Cl.
*F01D 17/02*  (2006.01)
*F01D 9/04*  (2006.01)

(52) U.S. Cl.
CPC ............ *F01D 17/02* (2013.01); *F01D 9/041* (2013.01); *F05D 2220/323* (2013.01); *F05D 2240/12* (2013.01); *F05D 2260/80* (2013.01)

(58) Field of Classification Search
CPC .... F01D 17/02; F01D 9/041; F05D 2220/323; F05D 2240/12
See application file for complete search history.

(56) References Cited

U.S. PATENT DOCUMENTS

| 4,139,822 A | * | 2/1979 | Urich ................. G01N 27/9006 |
| | | | 324/219 |
| 4,205,941 A | | 6/1980 | Fradin |
| 4,244,221 A | * | 1/1981 | Scott ....................... G01K 13/02 |
| | | | 374/E13.006 |
| 4,244,222 A | * | 1/1981 | Hoyer ...................... G01F 1/684 |
| | | | 416/61 |
| 4,298,312 A | * | 11/1981 | MacKenzie ........... F01D 21/003 |
| | | | 385/119 |

(Continued)

FOREIGN PATENT DOCUMENTS

| CN | 107061008 A | 8/2017 |
| CN | 107636258 A | 1/2018 |

(Continued)

OTHER PUBLICATIONS

Italian Search and Opinion in correspondence to Italian Application No. 102020000022096 issued May 19, 2021.

*Primary Examiner* — Brian Christopher Delrue
(74) *Attorney, Agent, or Firm* — McGarry Bair PC (57) ABSTRACT

An inter-turbine duct is positioned between a high pressure turbine and a low pressure turbine of a gas turbine engine. The inter-turbine duct includes an inner annular wall and an outer annular wall spaced apart from the inner annular wall along a radial direction to define an annular flow passage. The inter-turbine duct includes a plurality of circumferentially spaced vanes positioned within the flow passage and at least one temperature probe is positioned upstream of the vanes at a circumferential location that is between thirty and seventy percent of a circumferential distance between the leading edges of adjacent vanes.

19 Claims, 5 Drawing Sheets

(56) References Cited

U.S. PATENT DOCUMENTS

| | | | |
|---|---|---|---|
| 4,765,751 A * | 8/1988 | Pannone | G01K 13/02 |
| | | | 374/135 |
| 4,892,701 A | 1/1990 | Mauvieux et al. | |
| 4,989,406 A | 2/1991 | Vdoviak et al. | |
| 5,185,996 A * | 2/1993 | Smith | F01D 17/02 |
| | | | 415/118 |
| 8,506,836 B2 | 8/2013 | Szuromi et al. | |
| 9,309,809 B2 | 4/2016 | Johnson et al. | |
| 2003/0021677 A1 | 1/2003 | Matsutani | |
| 2007/0107504 A1* | 5/2007 | Smed | F01D 21/003 |
| | | | 73/112.01 |
| 2013/0195643 A1* | 8/2013 | Bharath | F01D 9/041 |
| | | | 29/402.01 |
| 2014/0186168 A1* | 7/2014 | Chuong | F01D 21/003 |
| | | | 415/182.1 |
| 2014/0355007 A1* | 12/2014 | Jousselin | F01D 21/003 |
| | | | 416/61 |
| 2015/0052872 A1 | 2/2015 | Zurmehly et al. | |
| 2015/0114006 A1 | 4/2015 | Tan et al. | |
| 2015/0144496 A1 | 5/2015 | Morris et al. | |
| 2015/0252753 A1 | 9/2015 | Lopez et al. | |
| 2015/0260103 A1 | 9/2015 | Yu et al. | |
| 2015/0337678 A1* | 11/2015 | Alonte | G01K 1/08 |
| | | | 415/118 |
| 2016/0003156 A1 | 1/2016 | Hanson | |
| 2016/0003157 A1 | 1/2016 | Ott et al. | |
| 2016/0084736 A1* | 3/2016 | Schleif | G01D 11/30 |
| | | | 73/112.01 |
| 2017/0184053 A1 | 6/2017 | Harvey et al. | |
| 2020/0025649 A1* | 1/2020 | Stowe | G01M 15/14 |
| 2020/0400080 A1 | 12/2020 | Bemmett et al. | |
| 2021/0003458 A1* | 1/2021 | Durocher | G01K 13/02 |

FOREIGN PATENT DOCUMENTS

| | | |
|---|---|---|
| EP | 2476867 A1 | 7/2012 |
| EP | 3058197 A1 | 8/2016 |
| EP | 3492701 A1 | 6/2019 |
| EP | 3628825 A1 | 4/2020 |
| GB | 2545711 A | 6/2017 |
| WO | 2015057549 A1 | 4/2015 |

* cited by examiner

PROBE PLACEMENT WITHIN A DUCT OF A GAS TURBINE ENGINE

CROSS REFERENCE TO RELATED APPLICATION(S)

This application claims priority to and benefit of IT Patent Application No. 102020000022096 filed Sep. 18, 2020, which is incorporated herein in its entirety.

RESEARCH STATEMENT

The project leading to this application has received funding from the Clean Sky 2 Joint Undertaking under the European Union's Horizon 2020 research and innovation programme under grant agreement No CS2-ENG-GAM-2014-2017-05.

FIELD

The present subject matter relates generally to gas turbine engines, and more particularly, to the improved placement of probes within ducts or passageways of a gas turbine engine.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Conventional gas turbine engines include various measurement probes positioned within a compressed air or hot gas path. For example, the probes may be positioned within an inlet duct upstream of a turbine section or within an inter-turbine duct between a high pressure turbine and a low pressure turbine for measuring the temperature or pressure of the air within the duct. However, these temperature probes are often positioned within the ducts such that the flow of air is disturbed and wakes are generated which interact with downstream components, e.g., downstream turbine rotor and stator vanes. These flow disturbances can cause performance losses that negatively impact module efficiency, e.g., turbine section efficiency, and harm overall engine performance.

Accordingly, a gas turbine engine with improved probe placement would be useful. More specifically, an inlet duct including temperature probes positioned and oriented to minimize performance losses and improve engine efficiency would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a high pressure turbine, a low pressure turbine positioned downstream of the high pressure turbine, and an inter-turbine duct positioned between the high pressure turbine and the low pressure turbine, the inter-turbine duct defining an axial direction, a radial direction, and a circumferential direction. The inter-turbine duct includes an inner annular wall and an outer annular wall spaced apart from the inner annular wall along the radial direction to define an annular flow passage. A plurality of circumferentially spaced vanes are positioned within the flow passage and extend between the inner annular wall and the outer annular wall, each of the vanes defining a leading edge, a circumferential distance being defined between the leading edges of adjacent vanes. A probe is positioned within the flow passage and extends substantially along the radial direction, the probe being positioned upstream from the vanes along the axial direction and at a circumferential location that is between thirty and seventy percent of the circumferential distance between the leading edges of adjacent vanes.

In another exemplary aspect of the present disclosure, an inlet duct defining an axial direction, a radial direction, and a circumferential direction is provided. The inlet duct includes an inner annular wall and an outer annular wall spaced apart from the inner annular wall to define an annular flow passage. A plurality of circumferentially spaced vanes are positioned within the flow passage and extend between the inner annular wall and the outer annular wall, each of the vanes defining a leading edge and a circumferential distance being defined between adjacent leading edges. A probe is positioned within the flow passage and extends substantially along the radial direction, the probe being positioned upstream from the vanes along the axial direction and at a circumferential location that is between thirty and seventy percent of the circumferential distance between the leading edges of adjacent vanes.

According to another aspect, a duct height of the flow passage is defined between the inner annular wall and the outer annular wall along the radial direction, and wherein a distal end of the probe is positioned at an immersion depth of approximately thirty percent of the duct height.

In another aspect, the probe is positioned such that an axial gap is defined between the probe and the leading edge along the axial direction, the axial gap being greater than half of an axial length of the vanes measured along the axial direction.

According to another embodiment, the circumferential location of the probe is about sixty percent of the circumferential distance between the leading edges of adjacent vanes.

In another embodiment, a reference line is defined between a center of the probe and the leading edge of a circumferentially adjacent vane, the reference line defining a reference angle relative to the axial direction, the reference angle being between twenty and seventy degrees. For example, the reference angle is approximately forty-five degrees.

In another aspect, a flow of air passing through the inter-turbine duct defines a primary flow direction defining a flow angle relative to the axial direction, and wherein the reference angle is substantially equivalent to the flow angle.

According to one embodiment, the probe has a non-circular cross section that is symmetrical about a center axis, and wherein the center axis extends at an axis angle relative to the axial direction that is substantially equivalent to the reference angle.

According to another embodiment, each of the plurality of vanes defines a chord line defining a chord angle relative to the axial direction, wherein the reference angle is substantially equivalent to the chord angle.

In another aspect, the inter-turbine duct includes a plurality of probes positioned equidistantly around the inter-turbine duct along the circumferential direction.

For example, the probe can extend through an aperture defined in the outer annular wall of the inter-turbine duct. In addition, according to an exemplary embodiment, the probe is a temperature probe.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

The present disclosure is generally directed to an inter-turbine duct that is positioned between a high pressure turbine and a low pressure turbine of a gas turbine engine. The inter-turbine duct includes an inner annular wall and an outer annular wall spaced apart from the inner annular wall along a radial direction to define an annular flow passage. The inter-turbine duct includes a plurality of circumferentially spaced vanes positioned within the flow passage and at least one temperature probe is positioned upstream of the vanes at a circumferential location that is between thirty and seventy percent of a circumferential distance between the leading edges of adjacent vanes.

Figure 1:
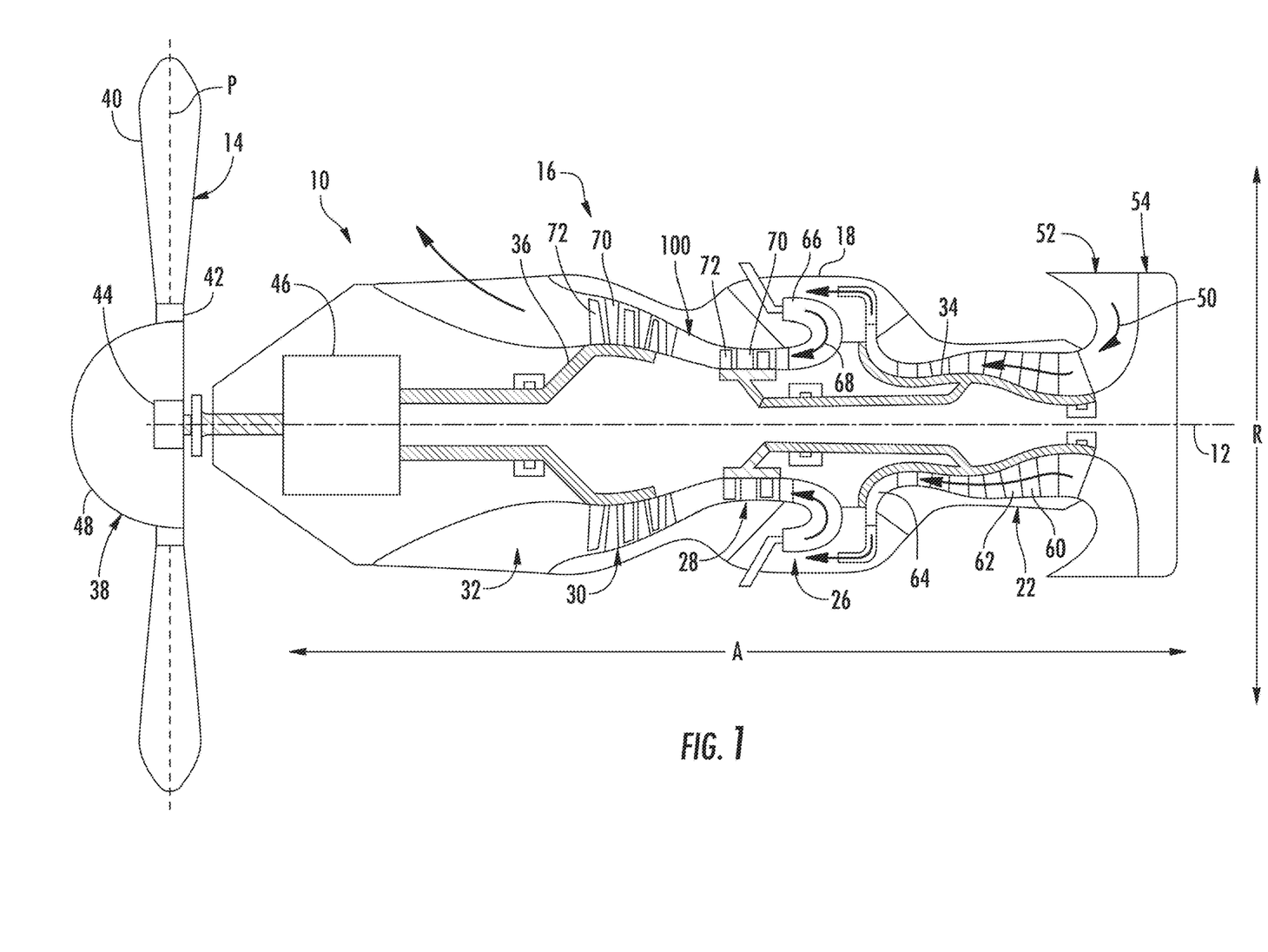
FIG. 1 is a schematic cross-sectional view of an exemplary gas turbine engine according to various embodiments of the present subject matter.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a reverse flow turboprop engine 10, referred to herein as "turboprop engine 10." As shown in FIG. 1, turboprop engine 10 defines an axial direction A (extending parallel to a longitudinal centerline or central axis 12 provided for reference), a radial direction R, and a circumferential direction C (not shown) disposed about the axial direction A. Turboprop engine 10 generally includes a fan section 14 and a core turbine engine 16 disposed downstream from the fan section 14, the fan section 14 being operable with, and driven by, core turbine engine 16.

The exemplary core turbine engine 16 depicted generally includes a substantially tubular outer casing 18 extending generally along axial direction A. Outer casing 18 generally encloses core turbine engine 16 and may be formed from a single casing or multiple casings. Core turbine engine 16 includes, in a serial flow relationship, a compressor 22, a combustion section 26, an HP turbine 28, an LP turbine 30, and an exhaust section 32. An air flow path generally extends through compressor 22, combustion section 26, HP turbine 28, LP turbine 30, and exhaust section 32 which are in fluid communication with each other.

A high pressure (HP) shaft or spool 34 drivingly connects the HP turbine 28 to the compressor 22. A low pressure (LP) shaft or spool 36 drivingly connects the LP turbine 30 to fan section 14 of the turboprop engine 10. For the embodiment depicted, fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems. Disk 42 is covered by a rotatable front hub 48 aerodynamically contoured to promote an airflow through the plurality of fan blades 40.

During operation of the turboprop engine 10, a volume of air 50 passes through blades 40 of fan 38 and is urged toward an annular inlet 52 of core turbine engine 16. More specifically, turboprop engine 10 includes an inlet body 54 that defines annular inlet 52 that routes an inlet portion of the flow of air 50 from inlet 52 downstream to compressor 22. Compressor 22 includes one or more sequential stages of compressor stator vanes 60, one or more sequential stages of compressor rotor blades 62, and an impeller 64. The one or more sequential stages of compressor stator vanes 60 are coupled to the outer casing 18 and compressor rotor blades 62 are coupled to HP shaft 34 to progressively compress the flow of air 50. Impeller 64 further compresses air 50 and directs the compressed air 50 into combustion section 26 where air 50 mixes with fuel. Combustion section 26 includes a combustor 66 which combusts the air/fuel mixture to provide combustion gases 68.

Combustion gases 68 flow through HP turbine 28 which includes one or more sequential stages of turbine stator vanes 70 and one or more sequential stages of turbine blades 72. The one or more sequential stages of turbine stator vanes 70 are coupled to the outer casing 18 and turbine blades 72 are coupled to HP shaft 34 to extract thermal and/or kinetic energy therefrom. Combustion gases 68 subsequently flow through LP turbine 30, where an additional amount of energy is extracted through additional stages of turbine stator vanes 70 and turbine blades 72 coupled to LP shaft 36. The energy extraction from HP turbine 28 supports operation of compressor 22 through HP shaft 34 and the energy extraction from LP turbine 30 supports operation of fan section 14 through LP shaft 36. Combustion gases 68 exit turboprop engine 10 through exhaust section 32.

It should be appreciated that the exemplary turboprop engine 10 depicted in FIG. 1 is by way of example only and that in other exemplary embodiments, turboprop engine 10 may have any other suitable configuration. For example, it should be appreciated that in other exemplary embodiments, turboprop engine 10 may instead be configured as any other suitable turbine engine, such as a turbofan engine, turbojet engine, internal combustion engine, etc. Furthermore, although turboprop engine 10 described above is an aeronautical gas turbine engine for use in a fixed-wing or rotor aircraft, in other exemplary embodiments, turboprop engine 10 may be configured as any suitable type of gas turbine engine that used in any number of applications, such as a land-based, industrial gas turbine engine, or an aeroderivative gas turbine engine.

In addition, in other exemplary embodiments, the turbine engine may include any suitable number of compressors, turbines, shafts, etc. For example, as will be appreciated, HP shaft 34 and LP shaft 36 may further be coupled to any suitable device for any suitable purpose. For example, in certain exemplary embodiments, turboprop engine 10 of FIG. 1 may be utilized to drive a propeller of a helicopter, may be utilized in aeroderivative applications, or may be attached to a propeller for an airplane. Additionally, in other exemplary embodiments, turboprop engine 10 may include any other suitable type of combustor, and may not include the exemplary reverse flow combustor depicted.

Referring still to FIG. 1, turboprop engine 10 may include an inter-turbine duct 100 positioned between the HP turbine 28 and the LP turbine 30 to provide fluid communication between the two. For example, referring also to FIG. 2, a close-up schematic view of turboprop engine 10 illustrates the positioning of inter-turbine duct 100 downstream of HP turbine 28 and upstream of LP turbine 30. Inter-turbine duct 100 generally transitions the flow between the two turbine sections, increasing the diameter of the flow of combustion gases 68. Inter-turbine duct 100 generally defines an axial direction A2, a radial direction R2, and a circumferential direction C2 (FIG. 3).

Figure 3:
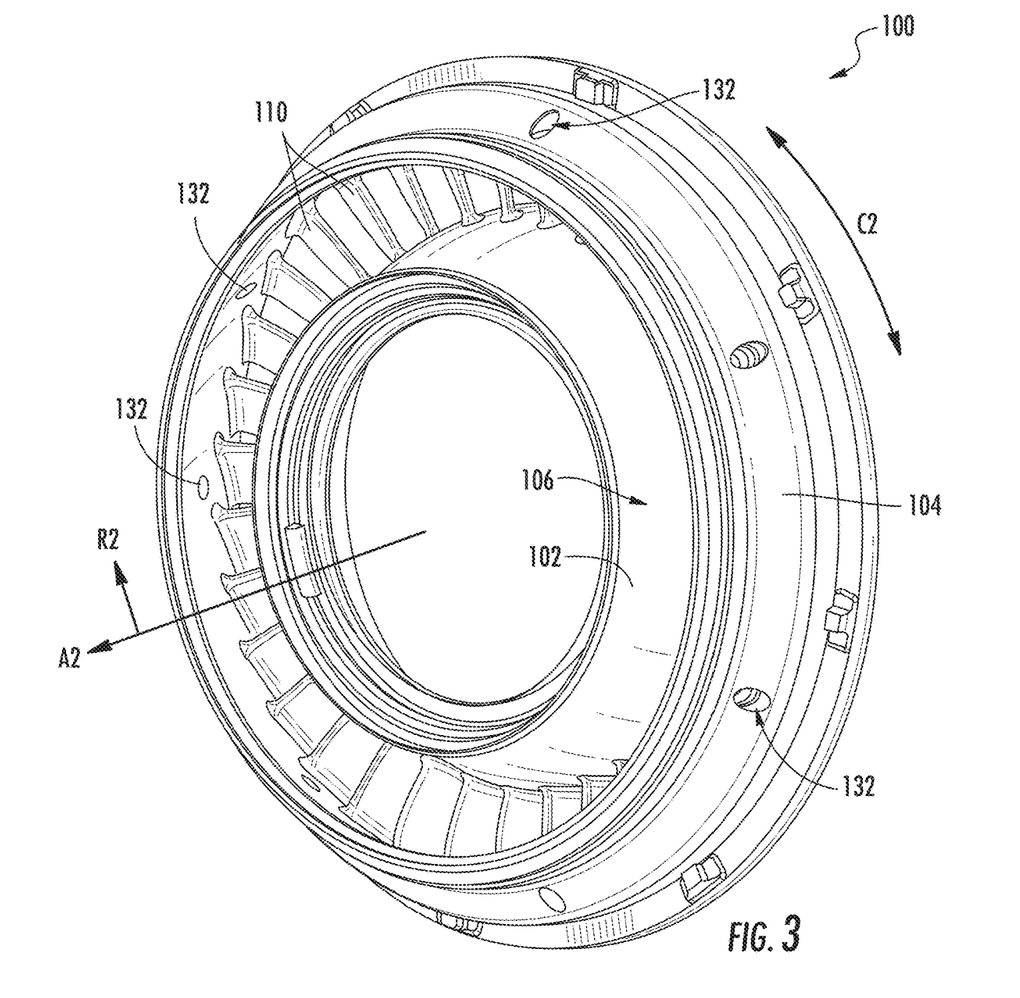
FIG. 3 provides a perspective view of the exemplary inter-turbine duct of FIG. 2.
Figure 4:
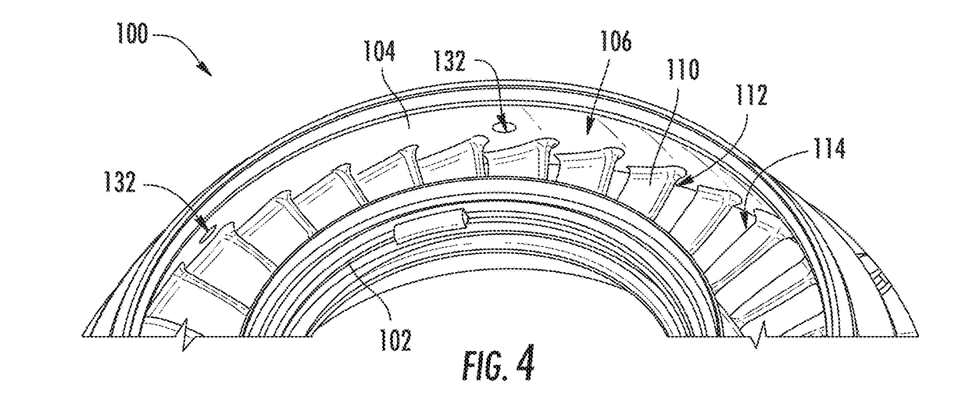
FIG. 4 provides another perspective view of the exemplary inter-turbine duct of FIG. 2.

Referring now also to FIGS. 3 and 4, inter-turbine duct 100 includes an inner annular wall 102 and an outer annular wall 104 spaced apart from inner annular wall 102 along the radial direction R2 to define an annular flow passage 106. In addition, inter-turbine duct 100 includes a plurality of circumferentially spaced vanes 110 positioned within flow passage 106 and extending between inner annular wall 102 and outer annular wall 104. Each vane 110 defines a leading edge 112 positioned upstream from a trailing edge 114. In addition, each vane 110 defines a chord line 116 that is a straight line extending between leading 112 and trailing edge 114.

Figure 5:
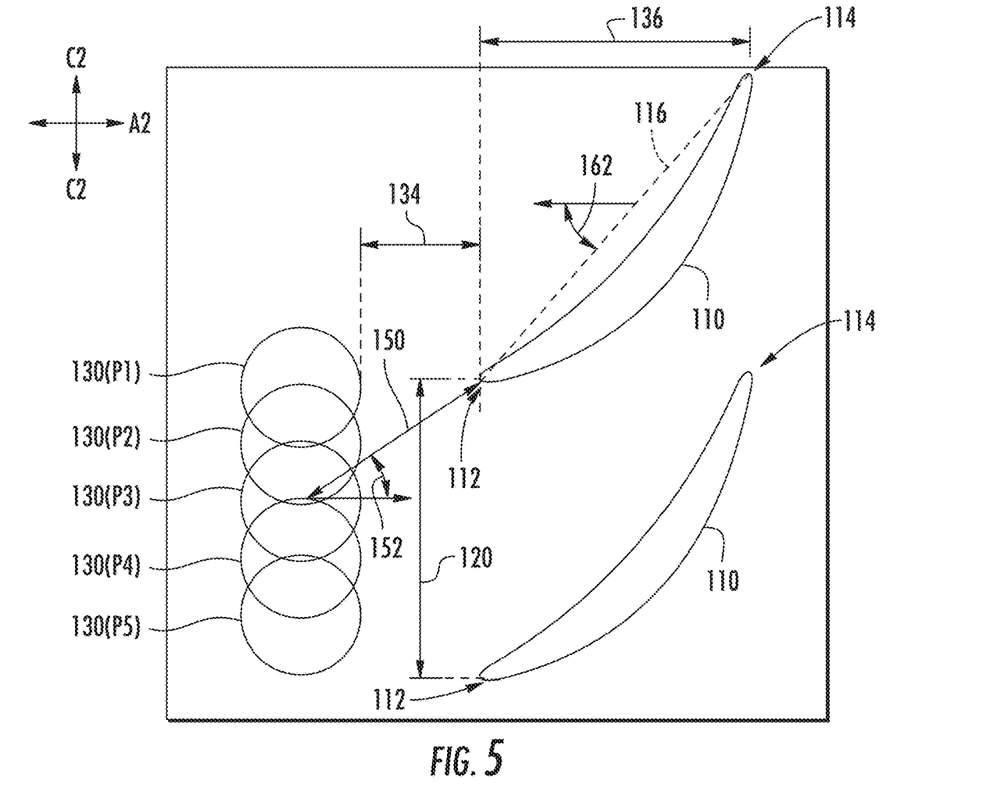
FIG. 5 provides a schematic view of five exemplary positions of a temperature probe within the exemplary inter-turbine duct of FIG. 2 according to an exemplary embodiment of the present subject matter.
Figure 6:
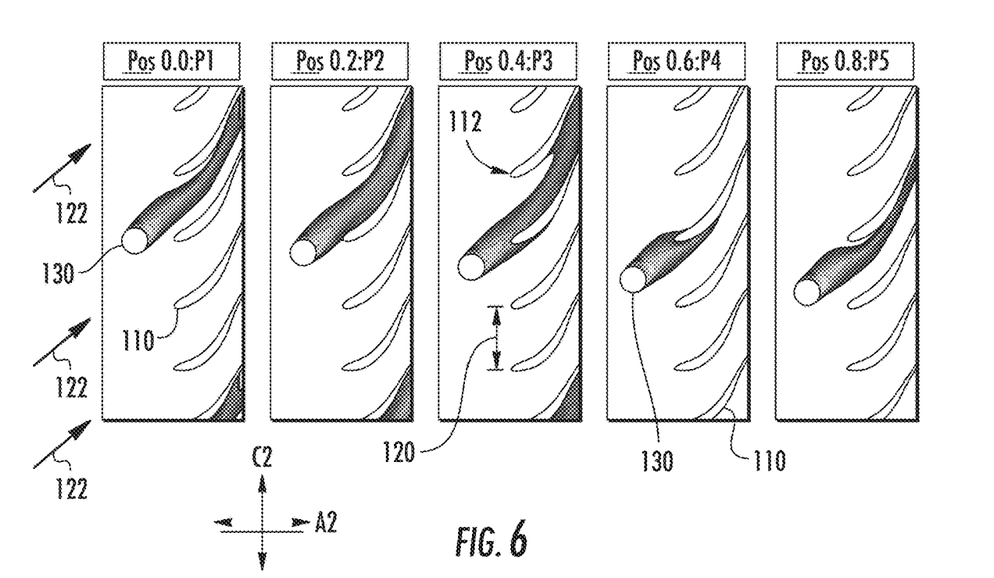
FIG. 6 illustrates the results of a computational fluid dynamics analysis of a flow of compressed air flowing through the exemplary inter-turbine duct of FIG. 2 when the exemplary temperature probe is positioned as illustrated in FIG. 5.

Referring now briefly to FIGS. 5 and 6, schematic cross-sectional views of vanes 110 are provided. More specifically, FIGS. 5 and 6 illustrate a cross section taken along the circumferential direction C2 through vanes 110 and looking inward along the radial direction R2. As illustrated, a circumferential distance 120 is defined between leading edges 112 of adjacent vanes 110. Vanes 110 are generally shaped, positioned, and oriented to direct and condition the flow of combustion gases 68 from the HP turbine 28 to the LP turbine 30 such that the pressure drop across inter-turbine duct 100 is minimized and the LP turbine efficiency 30 is increased. For example, FIGS. 5 and 6 illustrate a flow direction 122 that corresponds to a primary direction of flow of a flow field of combustion gases 68 through inter-turbine duct 100 during a full throttle engine operating condition. The circumferential distance 120 between vanes 110, as well as the number, size, orientation, etc. of vanes may be selected for optimal engine performance when subjected to combustion gases 68 having any particular flow direction 122.

Referring now to FIGS. 2 through 6, inter-turbine duct 100 may further include one or more probes 130 positioned within flow passage 106 and extending substantially along the radial direction R2. More specifically, according to the embodiment illustrated in FIG. 3, seven probes 130 (not illustrated in FIG. 3 for clarity, but see FIG. 2) extend through seven apertures 132 defined in outer annular wall 104. In addition, the illustrated embodiment includes a plurality of probes 130 positioned equidistantly around inter-turbine duct 100 along the circumferential direction C2, though any suitable number and positioning of probes 130 may be used according to alternative embodiments.

Probe 130 may be any suitable type of measurement probe for measuring any operating characteristic of turboprop engine 10. For example, according to the illustrated embodiment, probe 130 is a temperature probe, such as a thermocouple, a thermistor, or a resistance temperature detector. Alternatively, probe 130 could be a pressure sensor or any other suitable sensor. According to the illustrated embodiment, probe 130 is positioned upstream from vanes 110 along the axial direction A2. More specifically, according to the illustrated embodiment, probe 130 is positioned such that an axial gap 134 is defined between probe 130 and leading edge 112 along the axial direction A2. According to one embodiment, axial gap 134 is about one quarter of an axial length 136 (FIG. 5) of the vanes 110, the axial length being measured between leading edge 112 and trailing edge 114 of vane 110 along the axial direction A2. According to another exemplary embodiment, axial gap 134 is greater than one quarter or greater than one half of axial length 136. According to other embodiments, probe 130 should be placed as far upstream from leading edges 112 of vanes 110 as possible given the spacing restraints of inter-turbine duct 100.

Figure 2:
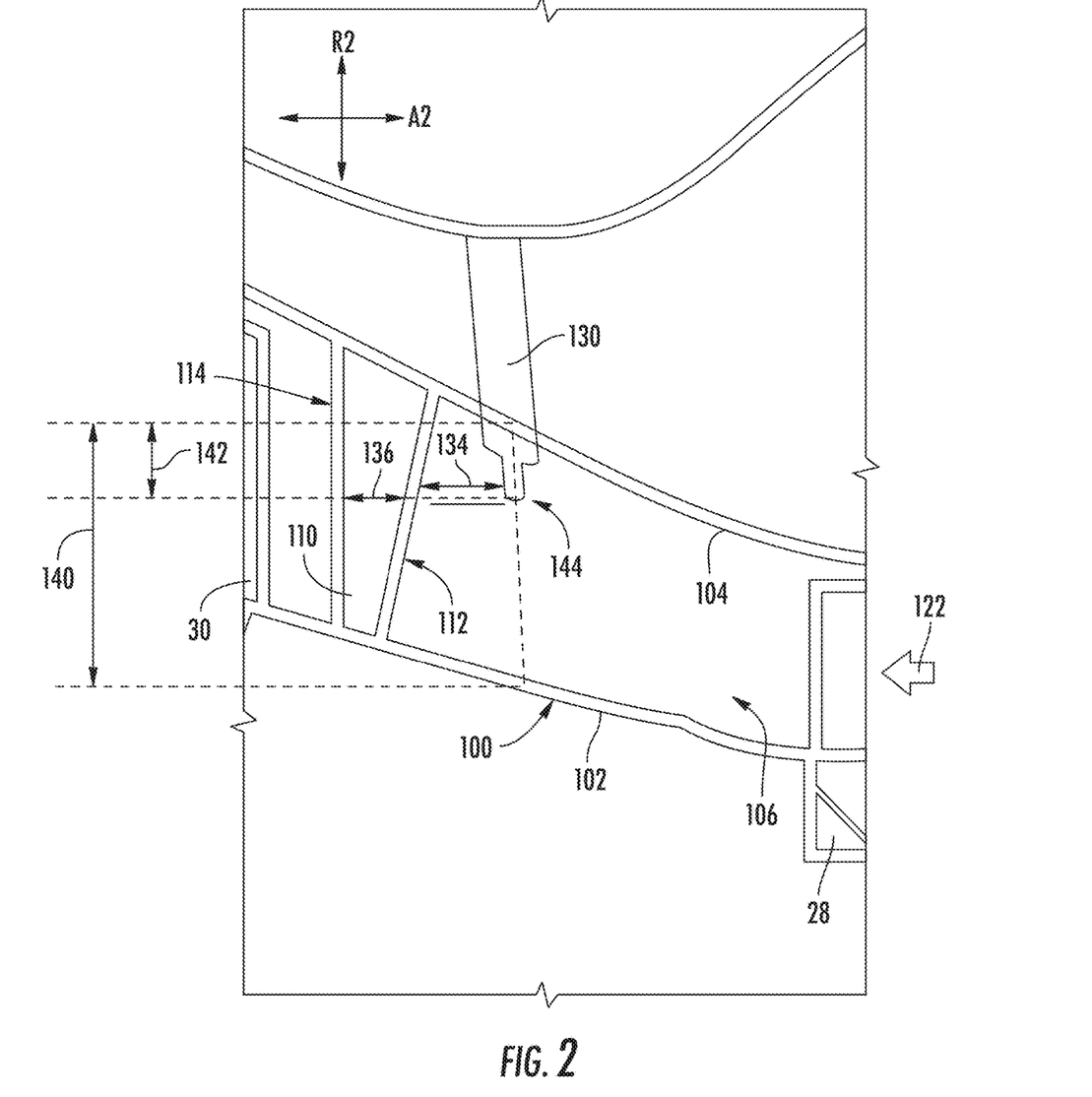
FIG. 2 is a schematic cross-sectional view of an inter-turbine duct that may be used in the exemplary gas turbine engine of FIG. 1 according to an exemplary embodiment of the present subject matter.

Referring to FIG. 2, the depth at which probe 130 is inserted may have an effect on the flow characteristics through inter-turbine duct 100. According to the illustrated embodiment, a duct height 140 of flow passage 106 is defined between inner annular wall 102 and outer annular wall 104 along the radial direction R2. In addition, an immersion depth 142 is defined as a distance between outer annular wall 104 and a distal end 144 of probe 130 measured along the radial direction R2. According to the illustrated embodiment, distal end 144 of probe 130 is positioned at an immersion depth 142 of approximately thirty percent of duct height 140. However, other immersion depths 142 may be used according to alternative embodiments.

Figure 7:
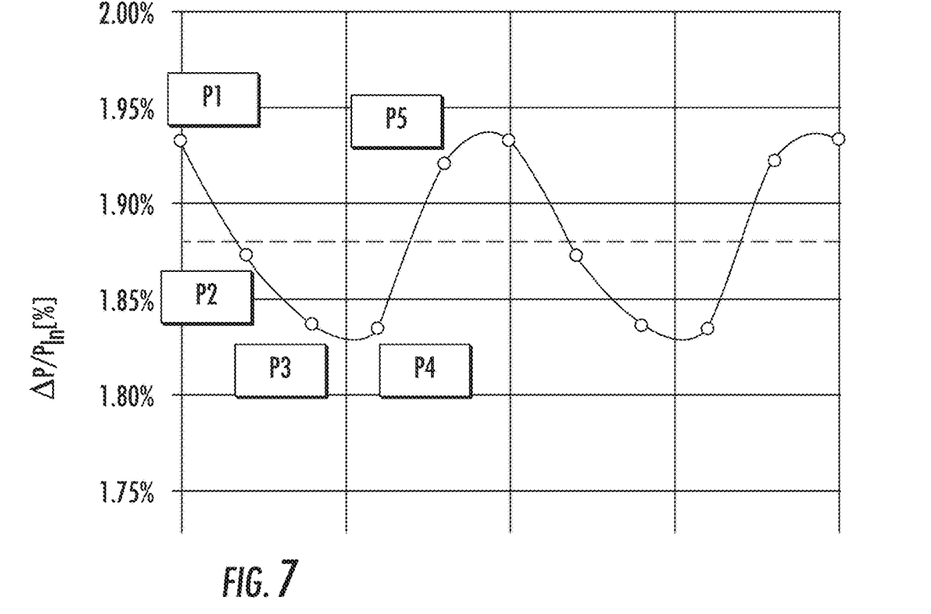
FIG. 7 is a plot illustrating the pressure drop of a flow of compressed air across a vane of the exemplary inter-turbine duct of FIG. 2 when the exemplary temperature probe is positioned as illustrated in FIG. 5.

Referring now specifically to FIGS. 5 and 6, the circumferential positioning of probe 130 will be described. In this regard, FIG. 5 provides a schematic view of vanes 110 and five exemplary positions of probe 130 (i.e., P1 through P5) within inter-turbine duct 100. FIG. 6 illustrates the results of a computational fluid dynamics analysis of a flow of air flowing through inter-turbine duct 100 with the probes 130 located as shown in FIG. 5. Notably, the circumferential position of probe 130 relative to the direction of flow 122 and the position and orientation of vanes 110 may have a significant effect on pressure drop and the overall performance of turboprop engine 10. In this regard, FIG. 7 is a plot illustrating the pressure drop of a flow of compressed air across a vane 110 of inter-turbine duct 100 when probe 130 is positioned as illustrated in FIG. 5.

As used herein, the "circumferential location" of probe 130 will be described in terms of the relative positioning of probe 130 to adjacent vanes 110. In this regard, P1 refers to a probe 130 position where a center of probe 130 is directly upstream of leading edge 112 along the axial direction A2, i.e., P1 shares a circumferential location with leading edge 112. By contrast, when probe 130 is in positions P2, P3, P4, and P5, the center of probe 130 is at a circumferential location that is positioned at 20%, 40%, 60%, and 80%, respectively, along the circumferential distance 120 defined between leading edges 112 of adjacent vanes 110. As illustrated in FIG. 7, according to an exemplary embodiment, the circumferential location of probe 130 is preferably between position P2 and P5, or between thirty and seventy percent of the circumferential distance between leading edges 112 of adjacent vanes 110, or about 60% along circumferential distance 120 (i.e., position P4). For example, as shown, position P4 of probe 130 minimizes the pressure drop across inter-turbine duct 100 for the given flow direction 122.

According to another exemplary embodiment, the positioning of probe 130 may be defined relative to a reference line 150 that is defined between a center of probe 130 and leading edge 112 of a circumferentially adjacent vane 110. In addition, reference line 150 defines a reference angle 152 relative to the axial direction A2. For clarity of illustration, reference line 150 and reference angle 152 are illustrated in FIG. 5 only for probe 130 in the P3 position. According to one exemplary embodiment, reference angle 152 is between about twenty and seventy degrees. According to another embodiment, reference angle 152 is about forty-five degrees.

Figure 8:
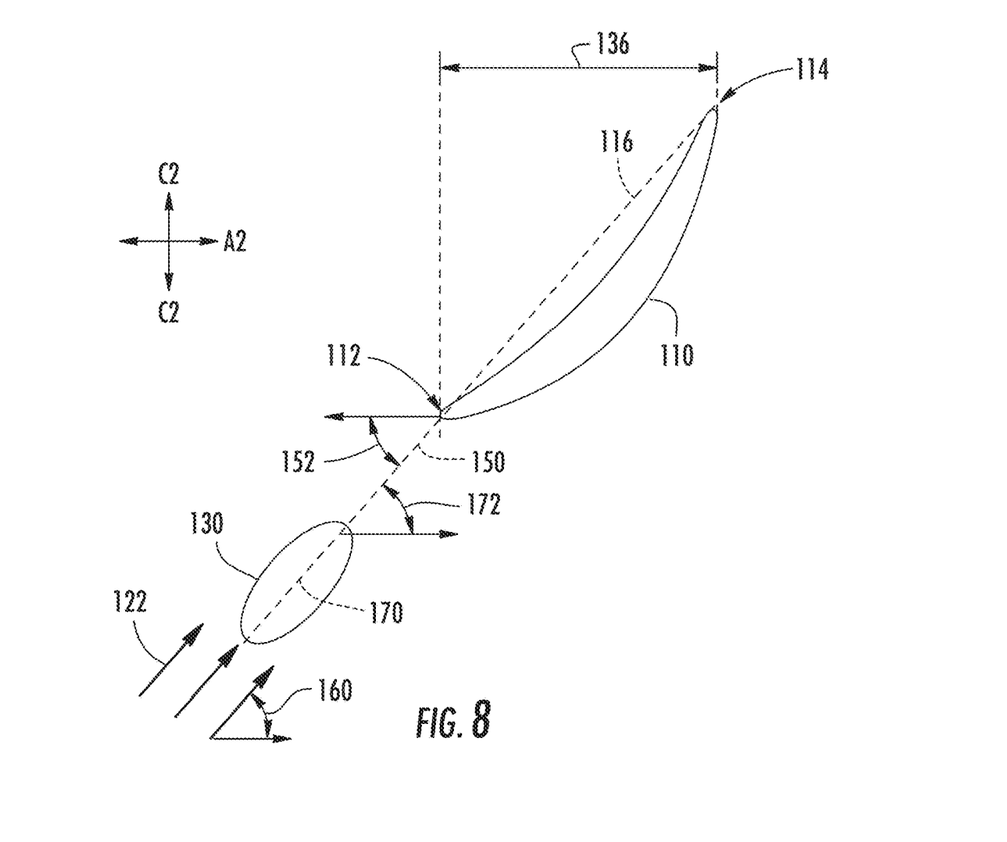
FIG. 8 provides a schematic view of an exemplary position of a temperature probe within the exemplary inter-turbine duct of FIG. 2 according to an exemplary embodiment of the present subject matter.

Referring now specifically to FIGS. 5 and 8, according to still another embodiment, the flow of air passing through inter-turbine duct 100 defines primary flow direction 122 which defines a flow angle 160 relative to the axial direction A2. According to an exemplary embodiment flow angle 160 is substantially equivalent to reference angle 152. Similarly, according to exemplary embodiments, chord line 116 may define a chord angle 162 and reference angle 152 may be substantially equivalent to chord angle 162.

According to another embodiment illustrated in FIG. 8, probe 130 has a non-circular cross section that is symmetrical about a center axis 170. Center axis 170 extends at an axis angle 172 relative to the axial direction A2 that, according to an exemplary embodiment, is substantially equivalent to reference angle 152. In addition, according to another embodiment, axis angle 172, reference angle 152, and flow angle 160 are all identical. It should be appreciated that the angles described herein are only exemplary and are selected based on a particular configuration of turboprop engine 10. Other suitable angles and probe 130 positions may be used according to alternative embodiments to minimize pressure drop and improve engine efficiency.

Inter-turbine duct 100 is used herein as an exemplary embodiment for illustrating aspects of the present subject matter. More particularly, the configuration of inter-turbine duct 100 as well as the number, size, position, and orientation of vanes 110 and temperature probes 130 are only exemplary and used to explain aspects of the present subject matter. It should be appreciated that aspects of the present subject matter may be used to achieve the proper positioning of any number or type of probes, in any suitable duct, and for any application. For example, aspects of the present subject matter may be used to place a probe in another duct within turboprop engine 10 or in a duct of another gas turbine engine. Alternatively, aspects of the present subject matter may be applied to position temperature probes in other locations and in the automotive, aviation, maritime, and other industries to assist in improving engine efficiency and operation.

Further aspects of the invention are provided by the subject matter of the following clauses:

1. A gas turbine engine comprising: a high pressure turbine; a low pressure turbine positioned downstream of the high pressure turbine; and an inter-turbine duct positioned between the high pressure turbine and the low pressure turbine, the inter-turbine duct defining an axial direction, a radial direction, and a circumferential direction, the inter-turbine duct comprising: an inner annular wall; an outer annular wall spaced apart from the inner annular wall along the radial direction to define an annular flow passage; a plurality of circumferentially spaced vanes positioned within the flow passage and extending between the inner annular wall and the outer annular wall, each of the vanes defining a leading edge, a circumferential distance being defined between the leading edges of adjacent vanes; and a probe positioned within the flow passage and extending substantially along the radial direction, the probe being positioned upstream from the vanes along the axial direction and at a circumferential location that is between thirty and seventy percent of the circumferential distance between the leading edges of adjacent vanes.

2. The gas turbine engine of any preceding clause, wherein a duct height of the flow passage is defined between the inner annular wall and the outer annular wall along the radial direction, and wherein a distal end of the probe is positioned at an immersion depth of approximately thirty percent of the duct height.

3. The gas turbine engine of any preceding clause, wherein the probe is positioned such that an axial gap is defined between the probe and the leading edge along the axial direction, the axial gap being greater than half of an axial length of the vanes measured along the axial direction.

4. The gas turbine engine of any preceding clause, wherein the circumferential location of the probe is about sixty percent of the circumferential distance between the leading edges of adjacent vanes.

5. The gas turbine engine of any preceding clause, wherein a reference line is defined between a center of the probe and the leading edge of a circumferentially adjacent vane, the reference line defining a reference angle relative to the axial direction, the reference angle being between twenty and seventy degrees.

6. The gas turbine engine of any preceding clause, wherein the reference angle is approximately forty-five degrees.

7. The gas turbine engine of any preceding clause, wherein a flow of air passing through the inter-turbine duct defines a primary flow direction defining a flow angle relative to the axial direction, and wherein the reference angle is substantially equivalent to the flow angle.

8. The gas turbine engine of any preceding clause, wherein the probe has a non-circular cross section that is symmetrical about a center axis, and wherein the center axis extends at an axis angle relative to the axial direction that is substantially equivalent to the reference angle.

9. The gas turbine engine of any preceding clause, wherein each of the plurality of vanes defines a chord line defining a chord angle relative to the axial direction, wherein the reference angle is substantially equivalent to the chord angle.

10. The gas turbine engine of any preceding clause, wherein the inter-turbine duct comprises a plurality of probes positioned equidistantly around the inter-turbine duct along the circumferential direction.

11. The gas turbine engine of any preceding clause, wherein the probe extends through an aperture defined in the outer annular wall of the inter-turbine duct.

12. The gas turbine engine of any preceding clause, wherein the probe is a temperature probe.

13. An inlet duct defining an axial direction, a radial direction, and a circumferential direction, the inlet duct comprising: an inner annular wall; an outer annular wall spaced apart from the inner annular wall to define an annular flow passage; a plurality of circumferentially spaced vanes positioned within the flow passage and extending between the inner annular wall and the outer annular wall, each of the vanes defining a leading edge and a circumferential distance being defined between adjacent leading edges; and a probe positioned within the flow passage and extending substantially along the radial direction, the probe being positioned upstream from the vanes along the axial direction and at a circumferential location that is between thirty and seventy percent of the circumferential distance between the leading edges of adjacent vanes.

14. The inlet duct of any preceding clause, wherein a duct height of the flow passage is defined between the inner annular wall and the outer annular wall along the radial direction, and wherein a distal end of the probe is positioned at an immersion depth of approximately thirty percent of the duct height.

15. The inlet duct of any preceding clause, wherein the probe is positioned such that an axial gap is defined between the probe and the leading edge along the axial direction, the axial gap being greater than half of an axial length of the vanes measured along the axial direction.

16. The inlet duct of any preceding clause, wherein a reference line is defined between a center of the probe and the leading edge of a circumferentially adjacent vane, the reference line defining a reference angle relative to the axial direction, the reference angle being between twenty and seventy degrees.

17. The inlet duct of any preceding clause, wherein a flow of air passing through the inter-turbine duct defines a primary flow direction defining a flow angle relative to the axial direction, and wherein the reference angle is substantially equivalent to the flow angle.

18. The inlet duct of any preceding clause, wherein the probe has a non-circular cross section that is symmetrical about a center axis, and wherein the center axis extends at an axis angle relative to the axial direction that is substantially equivalent to the reference angle.

19. The inlet duct of any preceding clause, wherein each of the plurality of vanes defines a chord line defining a chord angle relative to the axial direction, wherein the reference angle is substantially equivalent to the chord angle.

20. The inlet duct of any preceding clause, wherein the inlet duct is positioned between a high pressure turbine and a low pressure turbine in a gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a high pressure turbine; a low pressure turbine positioned downstream of the high pressure turbine; and
an inter-turbine duct positioned between the high pressure turbine and the low pressure turbine, the inter-turbine duct defining an axial direction, a radial direction, and a circumferential direction, the inter-turbine duct comprising:
an inner annular wall;
an outer annular wall spaced apart from the inner annular wall along the radial direction to define an annular flow passage;
a plurality of circumferentially spaced vanes positioned within the flow passage and extending between the inner annular wall and the outer annular wall, each of the vanes is a stationary guide vane defining a leading edge, a circumferential distance being defined between the leading edges of adjacent vanes that increases in a circumferential direction that extends from a suction side of a first one of the adjacent vanes to a pressure side of a second one of the adjacent vanes; and
a probe positioned within the flow passage and extending substantially along the radial direction, the probe being positioned upstream from the vanes along the axial direction such that an axial gap is defined between the probe and the leading edge of a respective vane along the axial direction, the axial gap being greater than one quarter of an axial length of the respective vane measured along the axial direction, the probe being further positioned at a circumferential location that is between thirty and seventy percent of the circumferential distance between the leading edges of adjacent vanes, the probe configured to measure an operating characteristic of the gas turbine engine.

2. The gas turbine engine of claim 1, wherein a duct height of the flow passage is defined between the inner annular wall and the outer annular wall along the radial direction, and wherein a distal end of the probe is positioned at an immersion depth of approximately thirty percent of the duct height.

3. The gas turbine engine of claim 1, wherein the axial gap is greater than half of an axial length of the vanes measured along the axial direction.

4. The gas turbine engine of claim 1, wherein the circumferential location of the probe is in a range that is between forty and sixty percent of the circumferential distance between the leading edges of adjacent vanes.

5. The gas turbine engine of claim 1, wherein a reference line is defined between a center of the probe and the leading edge of a circumferentially adjacent vane, the reference line defining a reference angle relative to the axial direction, the reference angle being between twenty and seventy degrees.

6. The gas turbine engine of claim 5, wherein the reference angle is approximately forty-five degrees.

7. The gas turbine engine of claim 5, wherein a flow of air passing through the inter-turbine duct defines a primary flow direction defining a flow angle relative to the axial direction, and wherein the reference angle is substantially equivalent to the flow angle.

8. The gas turbine engine of claim 5, wherein the probe has a non-circular cross section that is symmetrical about a center axis, and wherein the center axis extends at an axis angle relative to the axial direction that is substantially equivalent to the reference angle.

9. The gas turbine engine of claim 5, wherein each of the plurality of vanes defines a chord line defining a chord angle relative to the axial direction, wherein the reference angle is substantially equivalent to the chord angle.

10. The gas turbine engine of claim 1, wherein the inter-turbine duct comprises a plurality of probes positioned equidistantly around the inter-turbine duct along the circumferential direction.

11. The gas turbine engine of claim 1, wherein the probe extends through an aperture defined in the outer annular wall of the inter-turbine duct.

12. The gas turbine engine of claim 1, wherein the probe is a temperature probe.

13. An inlet duct defining an axial direction, a radial direction, and a circumferential direction, the inlet duct comprising:

an inner annular wall;
an outer annular wall spaced apart from the inner annular wall to define an annular flow passage;
a plurality of circumferentially spaced stationary vanes positioned within the flow passage and extending between the inner annular wall and the outer annular wall, each of the vanes defining a leading edge and a circumferential distance being defined between the leading edges of adjacent vanes that increases in a circumferential direction that extends from a suction side of a first one of the adjacent vanes to a pressure side of a second one of the adjacent vanes; and
a probe positioned within the flow passage and extending substantially along the radial direction, the probe being positioned upstream from the vanes along the axial direction such that an axial gap is defined between the probe and the leading edge of a respective vane along the axial direction, the axial gap being greater than one quarter of an axial length of the respective vane measured along the axial direction, the probe being further positioned at a circumferential location that is between thirty and seventy percent of the circumferential distance between the leading edges of adjacent vanes, the probe configured to measure an operating characteristic of a gas turbine engine.

14. The inlet duct of claim 13, wherein a duct height of the flow passage is defined between the inner annular wall and the outer annular wall along the radial direction, and wherein a distal end of the probe is positioned at an immersion depth of approximately thirty percent of the duct height.

15. The inlet duct of claim 13, wherein a reference line is defined between a center of the probe and the leading edge of a circumferentially adjacent vane, the reference line defining a reference angle relative to the axial direction, the reference angle being between twenty and seventy degrees.

16. The inlet duct of claim 15, wherein a flow of air passing through the inlet duct defines a primary flow direction defining a flow angle relative to the axial direction, and wherein the reference angle is substantially equivalent to the flow angle.

17. The inlet duct of claim 15, wherein the probe has a non-circular cross section that is symmetrical about a center axis, and wherein the center axis extends at an axis angle relative to the axial direction that is substantially equivalent to the reference angle.

18. The inlet duct of claim 15, wherein each of the plurality of vanes defines a chord line defining a chord angle relative to the axial direction, wherein the reference angle is substantially equivalent to the chord angle.

19. The inlet duct of claim 13, wherein the inlet duct is positioned between a high pressure turbine and a low pressure turbine in a gas turbine engine.

* * * * *